United States Patent [19]

Sone et al.

[11] Patent Number: 5,014,073

[45] Date of Patent: May 7, 1991

[54] SHIFTING MECHANISM FOR THERMAL HEAD OF A PRINTER

[75] Inventors: Masakazu Sone; Kozo Kawakita, both of Tokyo, Japan

[73] Assignee: Sony Corporation, Tokyo, Japan

[21] Appl. No.: 436,753

[22] Filed: Nov. 15, 1989

[30] Foreign Application Priority Data

Nov. 28, 1988 [JP] Japan ................................ 63-299940

[51] Int. Cl.[5] ......................... G01D 15/10; B41J 2/315

[52] U.S. Cl. ................................ 346/76 PH; 400/120

[58] Field of Search ........................ 400/621, 593, 120; 366/76 PH

[56] References Cited

FOREIGN PATENT DOCUMENTS 0218146 9/1987 Japan .................................. 400/120

0209965 8/1988 Japan .............................. 346/76 PH

*Primary Examiner*—Benjamin R. Fuller

*Assistant Examiner*—Huan Tran

*Attorney, Agent, or Firm*—Hill, Van Santen, Steadman & Simpson

[57] ABSTRACT

A printer is provided which includes a thermal head serving first, second, and third operation modes. In the first operation mode, the thermal head is separate from the platen roller so as to allow a new sheet of printing paper to be inserted, from a roll, for example. In the second operation mode, the thermal head is pressed against the platen roller to via the sheet of printing paper to print an image thereon. In the third operation mode, the thermal head contacts with the platen roller, but under only the slight pressure exerted by its own weight to secure the printed paper sheet to cut it into a predetermined size. The provision of the third operation mode wherein little head pressure is exerted on the platen roller also prevents compression set from occurring on the platen roller.

9 Claims, 3 Drawing Sheets

SHIFTING MECHANISM FOR THERMAL HEAD OF A PRINTER

BACKGROUND OF THE INVENTION

1. Technical Field

The present invention relates generally to a printing apparatus, and more particularly to an improved shifting mechanism for a thermal head relative to a platen roller of a printing apparatus.

2. Background Art

Thermal printers are well known in the art wherein a thermal head is pressed against a platen roller by the tensile force of a coil spring to print an image on a sheet of paper. The printing station of such a printer is provided with a thermal head and a platen roller. During printing operations, two positional relationships between the thermal head and the platen roller are provided. One is a first operational mode in which the thermal head is separated, or shifted away from the outer peripheral surface of the platen roller when printing is not being executed. The other is a second operational mode in which the thermal head is pressed against the platen roller to print an image on a sheet of paper.

In the first operational mode, a sheet of paper is inserted between the thermal head and the platen roller. In the next second operational mode, the platen roller rotates upon contact of the thermal head to begin printing. Usually, a spring and a linkage or cam is utilized for providing the two operational modes. For example, a head shifting mechanism which includes a coil spring and a cam is well known in the art. In this mechanism, the thermal head is supported by a retaining plate which swings about a shaft according to rotation of the cam.

When printing starts, a predetermined angular displacement of the cam by a drive motor causes the thermal head to be shifted down to the outer peripheral surface of the platen roller under pressure of the coil spring. After printing, a further angular displacement of the cam by a given angle causes the thermal head to be shifted away from the platen roller while further compressing the coil spring. Thus, this shifting of the thermal head requires large torque from the drive motor to work against the compression force of the coil spring.

With this arrangement, the thermal head is controlled to be automatically shifted up and down. However, in the shifting mechanism, if the thermal head is left in contact with the platen roller under pressure, a compression set occurs on the platen roller due to the pressure of the thermal head. On the other hand, if the thermal head is left separated from the platen roller, the sheet of paper tends to shift due to vibrations caused by operation of the drive motor or so forth. Further, shifting of the thermal head after printing allows the printed paper sheet to become dislodged from its correct position, inducing error in cutting the printed out paper sheet at a predetermined position on the paper.

SUMMARY OF THE INVENTION

It is accordingly an object of the present invention to avoid the disadvantages of the prior art.

More particularly, it is an object of the present invention to prevent compression set from occurring on the platen roller of a printer.

Still another object of the present invention is to avoid shifting of the paper to attain to easy cutting.

It is yet another object of the present invention to reduce the torque required for shifting a thermal head relative to a platen roller to allow a more compact motor to be used for driving the thermal head.

According to one aspect of the present invention, there is provided a thermal printing apparatus which comprises a thermal head for printing an image on a printing medium, a platen positioned opposite to the thermal head, and a driving means for moving the thermal head against the platen. The driving means has three conditions, that of first, second, and third modes. When the driving means has a condition of the first mode, the thermal head is a distance spaced from the platen. When the driving means has the condition of the second mode, the thermal head gives a pressure necessary to print the image on the printing medium and the platen. When the driving means has the condition of the third mode, the printing medium is attached to the platen by a pressure of the thermal head; but the pressure in said third mode against the platen is very little and scarcely transforms a form of the platen.

The printing medium may be a roll paper.

According to another aspect of the present invention, there is provided a printing apparatus for printing an image on a printing medium which comprises a platen roller provided at a printing station, a printing head for printing the image on the printing medium in cooperation with the platen roller, and a means for shifting the printing head relative to the platen roller to provide first and second operation modes. The first operation mode is such that the thermal head is pressed against the platen roller via the printing medium under a first pressure to print the image thereon. The second operation mode is such that the thermal head contacts the outer peripheral surface of the platen roller under a second pressure less than the first pressure to prevent compression set from occurring due to pressure exerted by the printing head.

In the preferred mode, the means further provides a third operation mode such that the printing head is separated from the platen roller. The third operation mode may be affected when a new printing medium is loaded into the printing apparatus.

The means may include a cam which rotates according to the printing operation to shift the printing head to the first, second, or third operation modes.

Further, the means may include a retainer for supporting the thermal head so that the thermal head comes in contact with the platen roller under the second pressure, that exerted by its own weight, in the second operation mode, a spring for acting on said retainer, and a cam rotating according to the printing operation to shift the retainer so as to urge the spring to provide the first pressure of the thermal head against the platen roller in the first operation mode.

According to a further aspect of the present invention, there is provided a printing apparatus for printing an image on a sheet of printing medium which comprises a platen roller provided at a printing station, a printing head for printing the image on the sheet of printing medium in cooperation with the platen roller, a biasing means for biasing the printing head with respect to the platen roller, and a means for selectively controlling a first operation mode and a second operation mode. The operation mode is such that the printing head is pressed against the platen roller with the printing medium therebetween in a state to activate the biasing to a first pressure to print the image thereon. The second operation mode is such that the thermal head contacts the outer peripheral surface of the platen roller in a state so as to deactivate the biasing means such that a second pressure less than the first pressure is applied so as to prevent compression set from occurring on the platen roller due to excess pressure, exerted by the printing head during the first operation mode.

In the preferred mode, the means further provides a third operation mode such that the printing head is separated from the platen roller so as to allow a new printing medium to be loaded into the printing station.

The biasing means may include a spring for shifting the printing head, the means including a cam which rotates according to the printing operation to activate the spring so as to provide the first pressure and to deactivate the spring so as to provide the second pressure.

BRIEF DESCRIPTION OF THE DRAWINGS

The present invention will be understood from the detailed description given hereinbelow and from the accompanying drawings of the preferred embodiment of the invention which are not intended to limit the invention to the specific embodiment but are for explanation and understanding only.

DESCRIPTION OF THE PREFERRED EMBODIMENT

Figure 1:
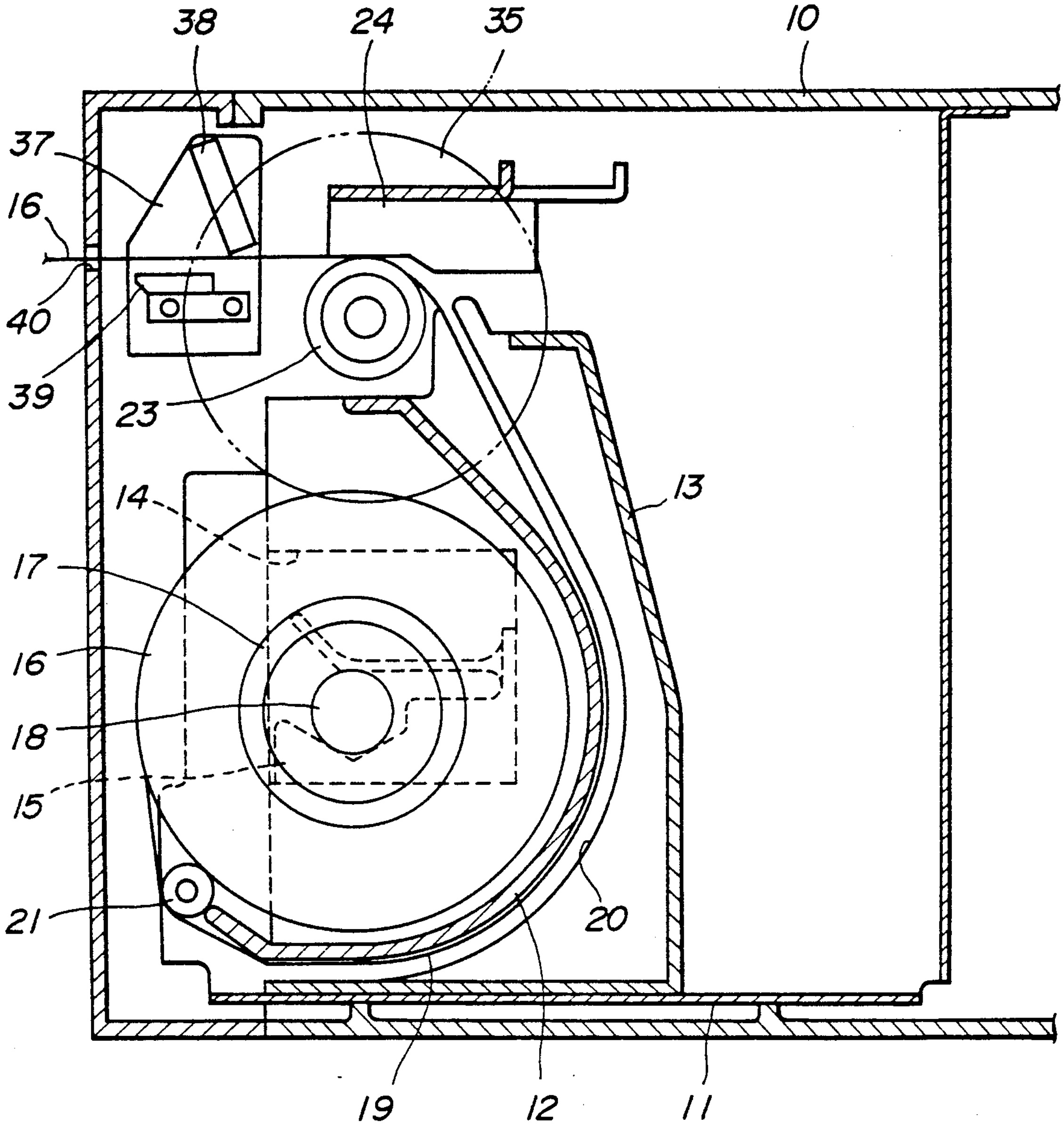
FIG. 1 is a sectional view which shows a printer according to the present invention.
Figure 2:
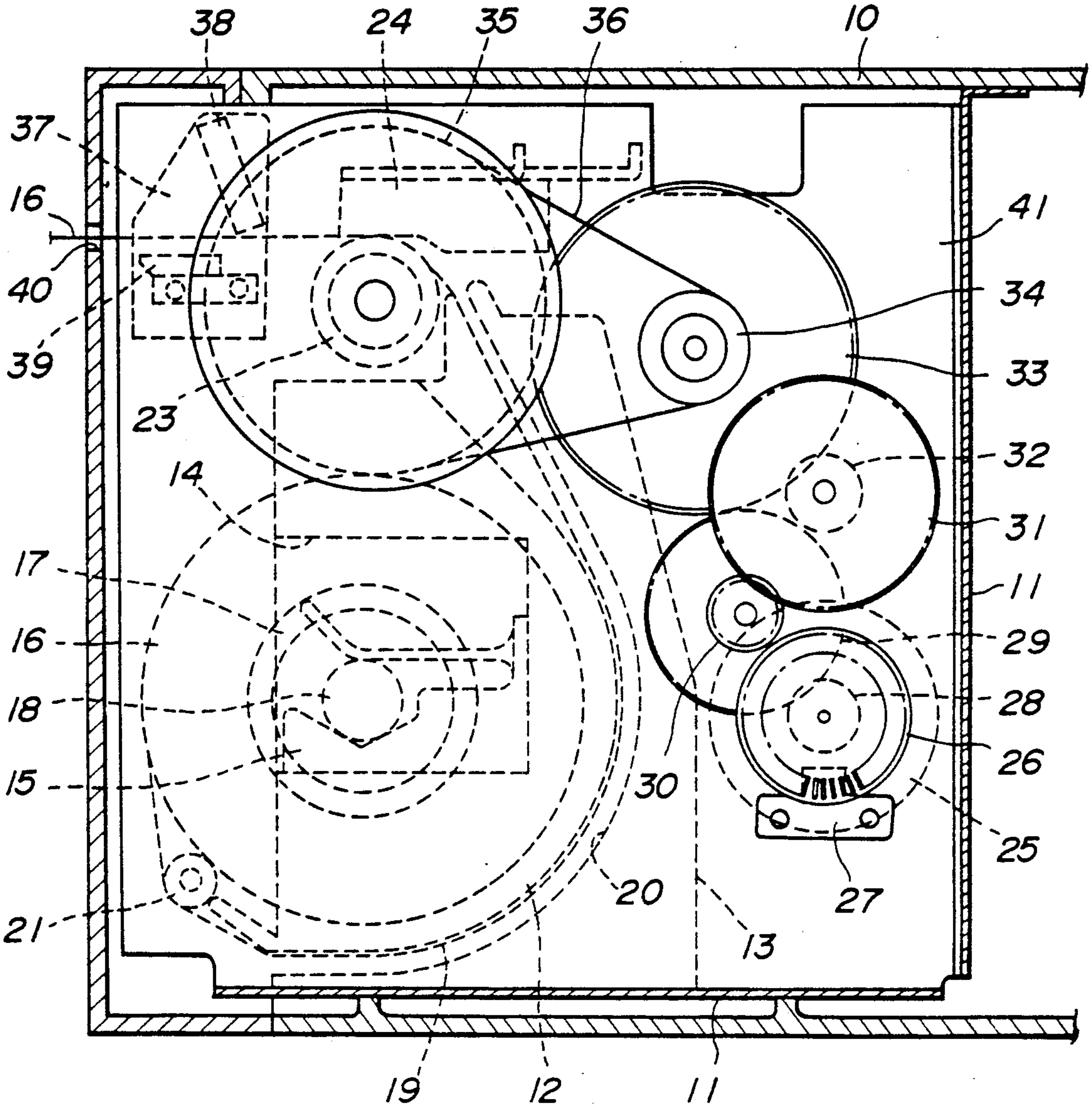
FIG. 2 is a schematic view which shows a drive system for a platen roller of a printer.

Referring now to the drawings, like numbers refer to like parts in the several views. FIGS. 1 and 2 show a printer according to the present invention. This printer has a rectangular parallelopiped casing 10 on which a mechanical chassis 11 is mounted. The mechanical chassis supports an inner paper guide plate 12 and an outer paper guide plate 13. At both sides of the inner paper guide plate 12, quadrilateral retainers 14 (only one is indicated) each have a bearing block 15 for rotatably supporting a shaft 18 on which a cylindrical reel 17 is disposed. A roll of printing paper 16 is wound around on the reel 17. Guide ribs 19 and 20 are integrally formed on the inner paper guide plate 12 and the outer paper guide plate 13 respectively. A paper loading path into which paper is loaded is defined between the guide ribs 19 and 20 so as to extend along the outer surface of the rolled printing paper 16.

Disposed at an edge of the inner paper guide plate 12 near an access of the paper loading path is a guide roller 21. Installed above the roll of printing paper is a rotatable platen roller 23. A thermal head 24 is arranged above the platen roller 23 so as to face it. A drive motor 25 for driving the platen roller 23 is, as shown in FIG. 2, mounted on a side wall 41 of the mechanical chassis. On the drive shaft of the motor 25, a slit disc 26 is installed which is associated with a photo-sensor 27 to constitute a so-called rotary encoder for determining the angular displacement of the drive motor 25.

Additionally, on the drive shaft of the motor 25, a gear 28 is installed, which meshes with a gear 29 as shown in FIG. 2. The gear 29 has a pinion 30 integrally formed therewith which meshes with a gear 31. Similar to the gear 29, a pinion 32 which meshes with a gear 33 having a pulley 34 is integrally formed on the gear 31.

On the platen roller 25, a pulley 35 is installed which is connected with the pulley 34 via a belt 36 to transmit drive torque to the platen roller 23 to rotate it. In front of the platen roller 23, a pair of cutters 38 and 39 supported by a bracket 37 are arranged vertically.

In a case where the paper, for example, is used up and a new cartridge of rolled paper has been loaded into the printer, the new printing paper 16 is wound around the reel 17 and the leading edge of the rolled paper is directed to the paper loading path defined by the ribs 19 and 20 of the inner and the outer paper guide plates 12 and 13 via guide roller 21. The paper loading path is, as described above, formed so as to extend along the periphery of the roll of the printing paper 16, so that the printing paper is smoothly fed to a printing station provided with the platen roller 23 and the thermal head 24 for printing. The printing paper is further inserted between the cutters 38 and 39 to be ejected outward from the casing 10 through an eject slit 40. This loading operation may be manually or automatically affected depending upon the type of printer.

After loading the printing paper as shown in FIG. 1, depression of a print start button (not shown) causes the drive motor 25 to be activated. The rotational speed of the drive motor 25 is then reduced by the gear train transmitting torque to the platen roller 23 via the pulleys 34 and 35. The thermal head presses the printing paper against the platen roller in order to print. The printed paper sheet 16 is conducted forward to be ejected through the eject slit 40 and cut by the cutters 38 and 39 at a predetermined position. This cutting operation is also manually or automatically affected depending upon the type of printer.

Figure 3:
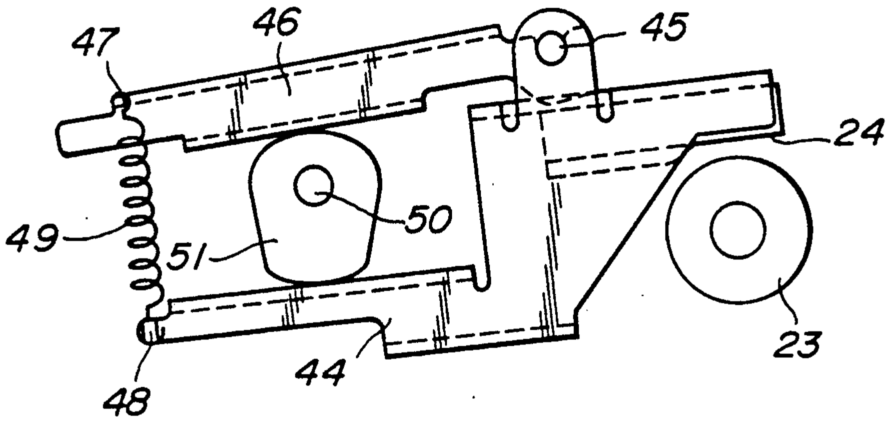
FIGS. 3 (A), 3 (B), and 3 (C), are side views which shows shifting mechanism for a thermal head of a printer according to the invention.
Figure 3:
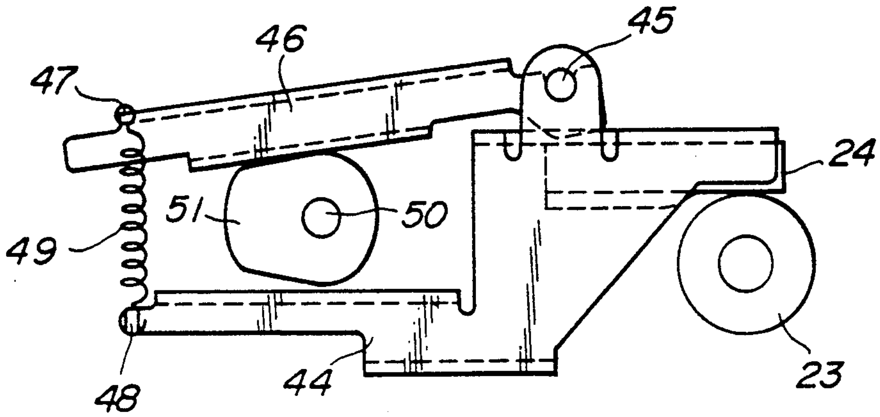
Figure 3:
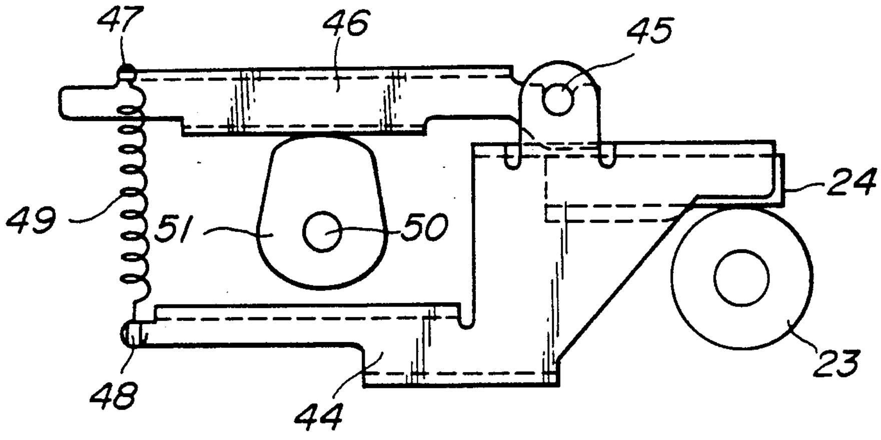

Referring to FIGS. 3(A), 3(B), and 3(C), a shifting mechanism for the thermal head according to the invention is shown. The illustrated thermal head is viewed from a direction opposite FIGS. 1 and 2. The thermal head 24 is supported by retaining plates 44 at both sides. These retaining plates are pivotably supported by a shaft 45 fixed on the mechanical chassis. A pressure plate 46 is located above the retaining plate 44. This pressure plate is also pivotably supported by the shaft 45 common to the retaining plate. Hooks 47 and 48 are provided on edge portions of the retaining plate 44 and the pressure plate 46 respectively. A coil spring 49 is hung between hooks 47 and 48 so as to pull the end portions of the retaining plate 46 and the pressure plate 44 mutually. Between the pressure plate 46 and the retaining plate 44, a camshaft 50 is disposed which is supported by the mechanical chassis 41. On the camshaft, a cam having a predetermined configuration is fixed.

When a portion of the cam 51 having the shorter radius contacts with the bottom of the pressure plate 46, the portion having a maximum radius pushes the retaining plate 44 against the spring force exerted by the coil spring 49, thereby causing the retaining plate to rotate in a counterclockwise direction (in the drawing) about the shaft 45. This action causes the thermal head 24 to be separated from the platen roller 23 as shown FIG. 3(A) (hereinafter, this positional relationship between the thermal head and the platen is referred to as a first head operation mode). This first head operation mode is affected when a cartridge of paper is replaced, or when a new cartridge is loaded into the printer as described above or for maintenance.

On the other hand, as shown in FIG. 3(C), the pressure plate 46 is pushed outwardly by the maximum radius portion of the cam 51 causing the pressure plate to rotate in a clockwise direction with respect to the shaft 45, tensing the coil spring 49. This tensile force urges the retaining plate 44 to rotate in a clockwise direction about the shaft 45 to press the thermal head 24 against the peripheral surface of the platen 23 to provide a second head operation mode.

In addition to the above mentioned first and the second head operation modes, a third head operation mode as shown in FIG. 3(B) is provided in the thermal printer according to the instant invention. This third head operation mode is such that the cam 51 is rotated by 90 degrees from the positions in the first head operation mode or the second head operation mode so as to maintain the maximum radius portion of the cam separate from both the retaining plate 44 and the pressure plate 46. In this operation mode, the angular position of the pressure plate 46 is the same as the first head operation mode as shown in FIG. 3(A). The coil spring 49 is not extended by the cam 51 and thus the retaining plate 44 tends to be rotated by only the weight of the thermal head in a clockwise direction, thereby causing the thermal head to softly come in contact with the peripheral surface of the platen roller 23. It will be noted that the thermal head contacts the platen roller with very little head pressure.

As mentioned above, the thermal printer according to the invention provides a third head operation mode wherein although the thermal head contacts with the platen 23, little head pressure is affected to overcome the disadvantages of conventional mechanisms for displacing a printing head.

In operation, depression of the start button (not shown) causes the cam 51 to rotate to place the thermal head 24 in the second operation mode wherein the thermal head pushes the sheet of paper 16 against the platen roller 23 in order to start printing. After printing, when the cam 51 is rotated in response to a signal indicating the end of the printing operation, the retaining plate 44 is freed to place the thermal head 24 in the third operation mode wherein the thermal head is in the head-down state under the pressure of its own weight only. In this operational mode, the printed sheet of paper is cut by the pair of cutters 38 and 39 at a predetermined position. The above printing operation cycle is repeated according to printing requirements.

Usually, the printer assumes the third operation mode regardless of whether the power switch is on or off. When the sheet of paper is used up, a paper sensor (not shown) senses the absence of a sheet of paper and a printing controller rotates the cam 51 to provide the third head operation mode wherein the thermal head is in a head-up state so as to allow a new sheet of paper to be set.

Therefore, the thermal head pressure acts on the platen roller only during printing to prevent compression set from occurring on the platen roller. Additionally, cutting of the printed paper is affected in the third head operation mode to avoid shifting of the paper by little head pressure exerted on the platen roller to achieve appropriate cutting. Moreover, large drive torque of the motor required for rotating the cam 51 against the tensile force is not needed compared with the conventional mechanism mentioned in the background art. This enables the use of a miniaturized drive motor.

Although the invention has been shown and described with respect to a best mode embodiment thereof, it should be understood by those skilled in the art that foregoing and various other changes, omissions, and additions in the form of may be made therein without departing from the spirit and scope of the invention.

What is claimed is:

1. A thermal printing apparatus, comprising:

a thermal head pivot member having first and second ends and a pivot point intermediate the first and second ends where the thermal head pivot member pivots about a fixed pivot point;

a thermal head means at said first end of the pivot member for printing an image onto a printing medium;

a platen roller positioned adjacent to said thermal head means;

spring means for biasing said thermal head means against said platen roller for printing;

rotatable cam means together with said spring means acting on said thermal head pivot member such that in a first position of the cam means said thermal head means is spaced a given distance from the platen roller, in a third position of the cam means the thermal head means being pressed against the platen roller with a first pressure sufficient to hold the sheet to be printed in position but not great enough to cause a significant compression set on the platen roller when not printing, and in a second position of the cam means the thermal head means being pressed against said platen roller with a second pressure greater than said first pressure sufficient for printing; and another pivot member pivotably attached at a first end to a fixed pivot point and a second opposite end to one end of the spring means, an opposite end of the spring means attaching to said second end of said thermal head pivot member, and said cam means being positioned to abut against said another pivot member so as to pivotably position it in three different angular positions in accordance with the first, second, and third positions of the cam means.

2. A printing apparatus according to claim 1 wherein the spring means is in a first extended position when the cam means is in the third position which is shorter than a second extended position when the cam means is in the second position.

3. A printing apparatus according to claim 1 wherein the spring means is attached adjacent the second end of the thermal head pivot member.

4. A printing apparatus according to claim 1 wherein the thermal head pivot member and said another pivot member have a same common pivot point.

5. A thermal printing apparatus, comprising:

a thermal head pivot member having first and second ends and a pivot point intermediate the first and second ends where the thermal head pivot member pivots about a fixed pivot point;

a thermal head means at said first end of the pivot member for printing an image onto a printing medium;

a platen roller positioned adjacent to said thermal head means;

spring means for biasing said thermal head means against said platen roller for printing;

rotatable cam means together with said spring means acting on said thermal head pivot member such that in a first position of the cam means said thermal head means is spaced a given distance from the platen roller, in a third position of the cam means the thermal head means being pressed against the platen roller with a first pressure sufficient to hold the sheet to be printed in position but not great enough to cause a significant compression set on the platen roller when not printing, and in a second position of the cam means the thermal head means being pressed against said platen roller with a second pressure greater than said first pressure sufficient for printing;

another pivot member pivotally attached at a first end to a fixed pivot point and at a second opposite end to one end of the spring means, an opposite end of the spring means attaching at said second end of said thermal head pivot member, and said cam means being positioned to abut against said another pivot member so as to pivotably position it in three different angular positions in accordance with the first, second, and third positions of the cam means; and in the third position of the cam means the first pressure being substantially determined by a weight of the thermal head means.

6. A printing apparatus, comprising:

a thermal head pivot member having first and second ends and which rotates about a fixed pivot point located intermediate the first and second ends;

a thermal head attached at the first end of the pivot member and a platen roller positioned adjacent the thermal head;

another pivot member having one end rotatable about said fixed pivot point and at its opposite end having one end of a spring attached, the other end of the spring attaching to the second end of the thermal head pivot member; and a three position cam means for abutting against said another pivot member so as to position it in three angular positions, a first of the angular positions corresponding to the thermal head being spaced from the platen roller, a third of the angular positions corresponding to the thermal head being in contact with the platen roller with a first pressure, and a second of the angular positions corresponding to the thermal head being in contact with the platen roller with a second pressure greater than the first pressure.

7. A printing apparatus according to claim 6 wherein said another pivot member fixed pivot point and the fixed pivot point of the thermal head pivot member are the same pivot point.

8. A printing apparatus according to claim 6 wherein the cam means is positioned between said another pivot member and the thermal head pivot member.

9. A thermal printing apparatus, comprising:

a thermal head pivot member having first and second ends and a pivot point intermediate the first and second ends where the thermal head pivot member pivots about a fixed pivot point;

a thermal head means at said first end of the pivot member for printing an image onto a printing medium;

a platen roller positioned adjacent to said thermal head means;

spring means for biasing said thermal head means against said platen roller for printing; and rotatable cam means together with said spring means acting on said thermal head pivot member such that in a first position of the cam means said thermal head means is spaced a given distance from the platen roller, in a third position of the cam means the thermal head means being pressed against the platen roller with a first pressure sufficient to hold the sheet to be printed in position but not great enough to cause a significant compression set on the platen roller when not printing, and in a second position of the cam means the thermal head means being pressed against said platen roller with a second pressure greater than said first pressure, said first pressure being substantially determined be a weight of the thermal head means and with the spring means not being substantially extended; and another pivot member pivotably attached at a first end to the fixed pivot point and at a second opposite end to one end of the spring means, an opposite end of the spring means attaching at said second end of said thermal head pivot member, and said cam means being positioned to abut against another pivot member so as to pivotably position it in three different angular positions in accordance with the first, second, and third positions of the cam means.

* * * * *